June 27, 1933.                L. G. BROADUS                1,915,289
                                REED GAUGE
                            Filed Aug. 17, 1931      2 Sheets-Sheet 1
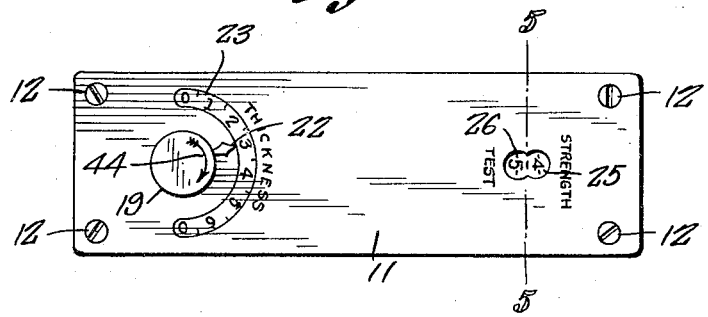
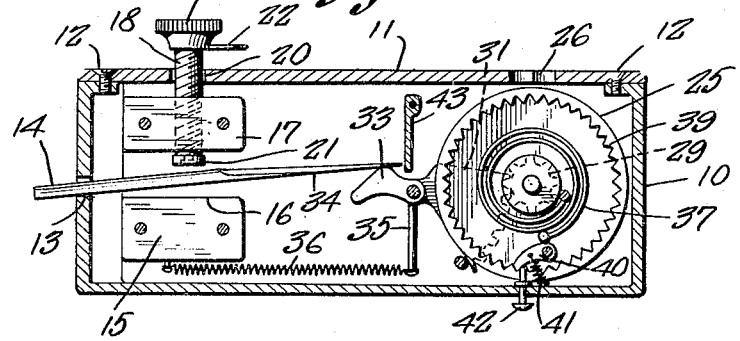
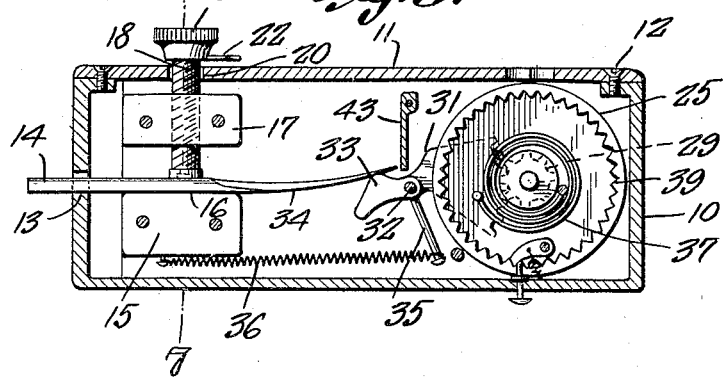
Lloyd G. Broadus,
INVENTOR June 27, 1933.    L. G. BROADUS    1,915,289
REED GAUGE
Filed Aug. 17, 1931    2 Sheets-Sheet 2
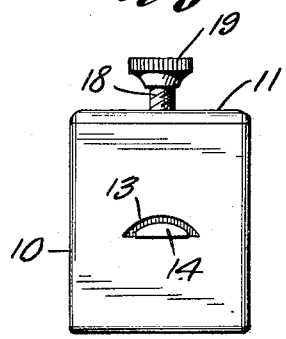
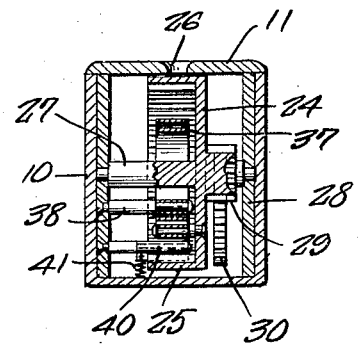
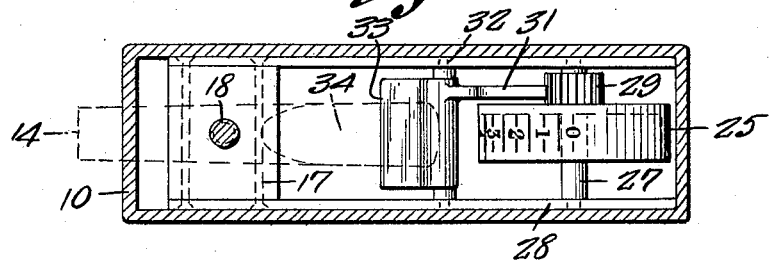
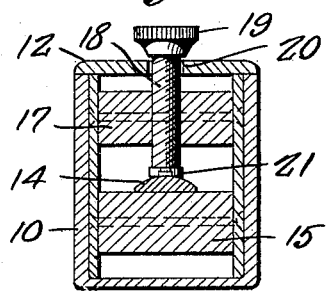
Lloyd G. Broadus,
INVENTOR
BY Victor J. Evans and Co. ATTORNEYS
WITNESS:

Patented June 27, 1933

1,915,289

UNITED STATES PATENT OFFICE

LLOYD G. BROADUS, OF LOS ANGELES, CALIFORNIA

REED GAUGE

Application filed August 17, 1931. Serial No. 557,638.

The invention relates to a reed gauge and more particularly to an instrument for testing reeds used in clarinets and saxophones.

The primary object of the invention is the provision of a device of this character wherein the strength of a vibrative reed for musical instruments of the clarinet and saxophone type can be readily gauged and tested so as to determine whether or not a reed is properly suited to the user of the instrument, the device being of novel form so that a reed can be tested and gauged with dispatch and accuracy.

Another object of the invention is the provision of a device of this character wherein the vibrative reed for the mouthpiece of a clarinet or saxophone can be readily and conveniently introduced and tested to determine the particular strength of such reed as suitable to the lips of a player of the instrument with which the same is to be associated, thereby eliminating guesswork in the selection of a particular reed for the mouthpiece of the instrument.

A further object of the invention is the provision of a device of this character, wherein the gauge and testing mechanism thereof is novel and operative for the perfect testing of a reed for use in the mouthpiece of the musical instrument.

A still further object of the invention is the provision of a device of this character which is extremely simple in construction, thoroughly reliable and efficient in its purposes, compact, so that the same can be carried in a convenient manner, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 1 is a plan view of the device constructed in accordance with the invention.

Figure 2 is a vertical longitudinal sectional view thereof.

Figure 3 is another vertical longitudinal sectional view showing the parts shifted when testing the reed from the position of the parts as shown in Figure 2.

Figure 4 is an end elevation.

Figure 5 is a vertical transverse sectional view taken on the line 5—5 of Figure 1.

Figure 6 is a horizontal longitudinal sectional view.

Figure 7 is a sectional view on the line 7—7 of Figure 3.

Similar reference characters indicate corresponding parts throughout the several views in the drawings.

Referring to the drawings in detail, the device comprises preferably a rectangular-shaped box-like casing 10 having an open top closed by a removable cover plate 11 which is detachably secured by fasteners 12, one end of the casing being formed with a mouth opening or entrance opening 13 into which is introduced the reed 14 usable in the mouthpiece of clarinets and saxophones for producing the vibrative tones of such instruments and this reed is adapted to be brought to rest upon a table in the form of a block 15 transversely disposed and made fast within the casing 10 next to the end having the mouth opening 13 with the top surface 16 flush with the lowermost edge of the mouth opening 13 so that the reed 14 can be brought to a level or in a horizontal plane to rest upon the table.

Superposed with relation to the table 15 and transversely supported in the casing 10 directly over said table is a bearing 17 in which is threaded a gauge screw 18 having at its outer end a knurled head 19, the screw being fitted in a suitable opening 20 in the cover 11 and its inner end has rotatably mounted thereon a terminal 21 to be brought into engagement with the reed 14 so as to bring the same to rest upon the table 15. The screw carries a pointer 22 next to its head to cooperate with an arcuate-shaped scale 23 mounted exteriorly upon the cover 11 concentric with respect to the screw 18 and such scale carries the digits ranging from one to six and the purpose of this scale is to enable a person to determine the thickness of the reed 14 in the testing of the strength thereof. The screw 18 is worked inwardly of the bearing 17 and outwardly therefrom by actuating the knurled head 19 thereof and in the turning of the same the pointer 22 traverses the scale 23 to cooperate therewith.

Within the casing 10 and rearwardly with respect to the table 15 is a strength testing mechanism which includes a wheel 24 having an annular rim 25 constituting a dial with digits thereon and graduating marks indicative of fractions of digits, these being visible through intercommunicating peep holes or sight openings 26 in the cover 11. The wheel is formed with a center axle 27 journaled at opposite ends in bearing plates 28 at the inner faces of the side of the casing 10. This axle 27 is formed with a pinion 29 meshing with teeth 30 on a sector 31 pivoted at 32, the sector being formed with an extension 33 constituting a member against which plays the tip 34 of the reed 14 when being tested.

The sector 31 carries a depending arm 35 with which is connected a coiled tensioning spring 36, the same being made fast to the bottom of the table 15 and this spring is operated to tension the sector 31 counter to the resistance of the tip 34 when the latter is forced by pressure against said fulcrum so as to rock the latter and in this movement the sector 31 actuates the wheel 24 bringing the digits or the fractional degree mark in association therewith to a position for vision through the opening 26 whereby on the reading of the dial the strength of the tip 34 of the reed 14 can be ascertained with accuracy.

The axle 27 of the wheel 24 has fixed thereto a coiled tensioning spring 37, the latter being anchored by a pin 38 which is fixed within the casing 10 and the purpose of this spring is to return the extension 33 to normal position after being depressed by the pressure of the tip 34 of the reed 14 thereon. The rim 25 constituting the dial of the wheel 24 has formed internally of said wheel ratchet teeth 39 with which is engaged a pivoted pawl or dog 40 tensioned by a spring 41 for ratchet action and this pawl or dog 40 is releasable by a push pin 42 movably fitted in the bottom of the casing 10 and manually operable from without said casing. The pawl 40 acting with the teeth 39 gives to the wheel 24 the proper drag for a reading of the dial and to avoid quick action thereof should a sudden turn be given to the screw 18, which should be more properly termed a micrometer screw.

Fitted within the casing 10 in the path of the reed 14 at the tip 34 thereof is the stop member 43 which limits the insertion of such reed 14 within the device.

It will be apparent that the thickness of the reed 14 can be determined and also the strength of the tip 34 thereof for determining the vibrative tone qualities of the same, the strength being determinable from the dial of the wheel 34, while the thickness of said reed is determinable by the scale 23 as should be obvious.

The opening 13 in the end of the casing 10 is of a size to accommodate variable size reeds usable in the mouth-pieces of clarinets and saxophones for producing the vibrative tones of such instruments.

The knurled head 19 has thereon an arrow 44 indicative of the direction of turning movement of the screw 20 for ascertaining the thickness of a reed on the insertion of the latter within the device.

What is claimed is:—

1. A device of the character described, comprising a casing of substantially rectangular cross section having a reed receiving mouth opening at the mid-point of one end wall, a table in said casing adjacent to the opening, a clamp screw threadedly mounted in the casing and having an end projecting from said casing and an end for engaging a reed when inserted through the opening to press it against the table, means on the screw and casing for coaction to indicate the thickness of the reed, a member rotatably supported in the casing and active upon the tip of the reed, a toothed sector on the member, a pinion meshing with the sector, a dial connected with the pinion, means for urging the member into engagement with the reed, a spring means urging the dial to zero position, and a drag device in ratchet engagement with the dial to avoid quick action thereof.

2. A device of the character described, comprising a casing of substantially rectangular cross section having a reed receiving mouth opening at the mid-point of one end wall, a table in said casing adjacent to the opening, a clamp screw threadedly mounted in the casing and having an end projecting from said casing and an end for engaging a reed when inserted through the opening to press it against the table, means on the screw and casing for coaction to indicate the thickness of the reed, a member rotatably supported in the casing and active upon the tip of the reed, a toothed sector on the member, a pinion meshing with the sector, a dial connected with the pinion, means for urging the member into engagement with the reed, a spring means urging the dial to zero position, a drag device in ratchet engagement with the dial to avoid quick action thereof, and means within the casing to form a stop adjacent to the trigger to limit the insertion of the reed within said casing.

In testimony whereof I affix my signature.

LLOYD G. BROADUS.